US009412554B2

(12) United States Patent
Behling

(10) Patent No.: US 9,412,554 B2
(45) Date of Patent: Aug. 9, 2016

(54) ANODE FOR AN X-RAY TUBE OF A DIFFERENTIAL PHASE CONTRAST IMAGING APPARATUS

(71) Applicant: KONINKLIJKE PHILIPS N.V., Eindhoven (NL)

(72) Inventor: Rolf Karl Otto Behling, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/905,874

(22) PCT Filed: Jul. 22, 2014

(86) PCT No.: PCT/EP2014/065657

§ 371 (c)(1),
(2) Date: Jan. 18, 2016

(87) PCT Pub. No.: WO2015/011111

PCT Pub. Date: Jan. 29, 2015

(65) Prior Publication Data

US 2016/0172148 A1 Jun. 16, 2016

(30) Foreign Application Priority Data

Jul. 23, 2013 (EP) .................................... 13177518

(51) Int. Cl.
*G03H 5/00* (2006.01)
*H01J 35/10* (2006.01)
*G21K 1/02* (2006.01)

(52) U.S. Cl.
CPC . *H01J 35/10* (2013.01); *G21K 1/02* (2013.01); *H01J 2235/086* (2013.01)

(58) Field of Classification Search
CPC . G03H 5/00; G03H 2210/00; G03H 2210/10; G03H 2210/11; G03H 2210/12; G21K 2207/005; A61B 6/484; G01N 23/00; G01N 23/02; G01N 23/04; G01N 23/06; G01N 23/08; G01N 23/083; G01N 23/20075; H01J 35/00; H01J 35/02; H01J 35/08; H01J 35/10; H01J 35/24; H01J 35/26
USPC .............................. 378/36, 62, 125, 143, 144
See application file for complete search history.

(56) References Cited

U.S. PATENT DOCUMENTS

| | | | |
|---|---|---|---|
| 7,817,777 B2 | 10/2010 | Baumann et al. |
| 8,374,309 B2 | 2/2013 | Donath et al. |
| 2010/0074395 A1 | 3/2010 | Popescu |
| 2010/0080341 A1 | 4/2010 | Popescu et al. |
| 2012/0099702 A1 | 4/2012 | Engel et al. |

FOREIGN PATENT DOCUMENTS

| | | |
|---|---|---|
| DE | 102008048688 A1 | 3/2010 |
| EP | 1731099 A1 | 12/2006 |
| WO | 2011070521 A1 | 6/2011 |
| WO | 2013001384 A1 | 1/2013 |

OTHER PUBLICATIONS

Qiang, Yang et al "Expermental Study of X-Ray Phase Contrast Imaging without Absorbing Grating", ACTA Phys. Sin. vol. 61, No. 16, 2012 Abstact.

*Primary Examiner* — Jurie Yun

(57) ABSTRACT

An Anode for an X-ray tube, comprising an anode disk comprising a circular focal track region being adapted to, upon impact of accelerated electrons, emit X-rays in an emission direction transverse to an impacting direction of the electrons; a ring-like modulating absorption grid; wherein the modulating absorption grid encloses the focal track region; wherein the modulating absorption grid comprises wall portions of X-ray absorbing material, the wall portions being arranged such as to absorb X-rays emitted from the focal track region in the emission direction; wherein the modulating absorption grid comprises slits between neighboring wall portions, the slits being arranged along a circumferential direction of the modulating absorption grid at spacings (s) of less than 100 μm and the slits having a width ($w_s$) in the circumferential direction of less than 50 μm.

15 Claims, 4 Drawing Sheets

ANODE FOR AN X-RAY TUBE OF A DIFFERENTIAL PHASE CONTRAST IMAGING APPARATUS

CROSS-REFERENCE TO PRIOR APPLICATIONS

This application is the U.S. National Phase application under 35 U.S.C. §371 of International Application No. PCT/EP2014/065657, filed on Jul. 22, 2014, which claims the benefit of European Patent Application No. 13177518.1, filed on Jul. 23, 2013. These applications are hereby incorporated by reference herein.

FIELD OF THE INVENTION

The present invention relates to an anode for an X-ray tube, an X-ray tube and a differential phase contrast imaging (DPCI) apparatus comprising such X-ray tube.

BACKGROUND OF THE INVENTION

X-ray tubes are provided for generating a beam of X-rays. This X-ray beam may be transmitted through an object of interest and the transmitted X-rays may be detected using an X-ray detector thereby providing information about X-ray absorbing characteristics of the object of interest. For example, X-ray tubes may be applied in medical imaging for visualizing internal structures of a region of interest in a patient.

Recently, X-ray differential phase-contrast imaging (DPCI) has been developed for visualizing a phase information of coherent X-rays passing through a scanned object of interest. In addition to conventional X-ray transmission imaging, DPCI may determine not only absorption properties of the scanned object along a projection line but may also provide information about a phase-shift of transmitted X-rays. Thereby, valuable additional information usable e.g. for contrast enhancement, material composition information or dose reduction may be provided.

Principles of DCPI are discussed e.g. in WO 2011/070 521, US 2012/00 99 702 A1 and EP 173 10 99 A1. Generally, a standard X-ray source is provided for generating an X-ray beam. Between the X-ray source and the object of interest, a grating or grid having small openings is positioned. This grating is typically referred to as source grating $G_0$. Portions of the X-ray beam transmitted through the openings of the source grating exhibit a certain degree of spatial optical coherence. Behind the object of interest, a second grating, typically named phase-shift grating $G_1$, is placed and may operate as a beam splitter. A resulting interference pattern typically contains required information about a beam phase-shift in relative positions of its minima and maxima which are typically in an order of several micrometers. Since a common X-ray detector, typically having a resolution in the order of 150 μm, is not able to resolve such fine structures of minima and maxima, the interference pattern is generally sampled with a third grating, typically referred to as phase analyzer grating or absorber grating $G_2$. The phase analyzer grating features the periodic pattern of transmitting and absorbing strips having a periodicity similar to the periodicity of the interference pattern. The similar periodicity generally produces a Moiré pattern behind the grating. This Moiré pattern has a much larger periodicity and is therefore detectable by a common X-ray detector. To obtain the phase-shift information, a shifting of one of the gratings, typically of the phase analyzer grating $G_2$, laterally by fractions of a grating pitch is generally provided. Such lateral shifting is also referred to as phase stepping. The phase-shift information may be extracted from the particular Moiré pattern measured for each position of the analyzer grating.

However, it has been observed that non-optimum DPCI results may occur for example due to excessive inaccuracies in the positioning of the various gratings with respect to each other. The gratings, particularly the phase-shift grating and the phase analyzer grating in conventional DPCI systems, may have to be translated with respect to each other with a very high positional accuracy. Such high positional accuracy may be hard to obtain particularly e.g. in DPCI systems in which the X-ray tube and the X-ray detector together with the gratings are to be moved during X-ray examination such as e.g. in medical C-arm or CT X-ray imaging systems.

SUMMARY OF THE INVENTION

Hence, there may be a need for an improved DPCI apparatus which may provide for improved imaging results and for an X-ray tube and an anode for such X-ray tube to be used in such DPCI apparatus. Particularly, there may be a need for a DPCI apparatus in which an X-ray tube, an X-ray detector and various grids may be moved with respect to an object of interest during X-ray imaging with reduced risk of deteriorated imaging results due to such component motions.

Such needs may be satisfied by the anode, the X-ray tube and the differential phase contrast imaging apparatus defined in the independent claims. Embodiments of the invention are defined in the dependent claims and the subsequent specification.

According to an aspect of the invention, an anode for an X-ray tube is proposed. The anode comprises an anode disc and a ring-like modulating absorption grid. The anode disc comprises a circular focal track region being adapted to, upon impact of accelerated electrons, emit X-rays in an emission direction transverse to an impacting direction of the electrons. The ring-like modulating absorption grid encloses the focal track region. Furthermore, the modulating absorption grid comprises wall portions of X-ray absorbing material. These wall portions are arranged such as to absorb X-rays emitted from the focal track region in the emission direction. Additionally, the modulating absorption grid comprises slits between neighboring wall portions, these slits being arranged along a circumferential direction of the modulating absorption grid at spacings of less than 100 μm, preferably less than 20 μm, and the slits having a width in the circumferential direction of less than 50 μm, preferably less than 5 μm.

Briefly summarized as a gist of the invention, the proposed anode may comprise a specific ring-like grid which is adapted to modulate an intensity of X-rays coming from a focal spot on the focal track region of the anode disk in terms of time and space due to its modulating absorption characteristics. These modulating absorption characteristics may result from the ring-like grid having wall portions of X-ray absorbing material and intermediate slits. While the wall portions may significantly absorb portions of the X-ray beam coming from the focal spot, other portions of the X-ray beam are transmitted through the intermediate slits without being significantly absorbed. As, during operation of the X-ray tube, the anode disk may be rotated together with the modulating absorption grid, the X-ray beam coming from the focal spot and being transmitted through the modulating absorption grid may be modulated in time and space periodically. In other words, the modulating absorption grid may serve as a source grating in a DPCI arrangement and as this modulating absorption grid is moved together with the rotating anode during operation of the X-ray tube, an X-ray beam emitted by the X-ray tube is modulated in time and space periodically. Such modulated X-ray beam may then be used in the DPCI apparatus for being transmitted through an object of interest, a phase-shift grating and a subsequent phase analyzer grating before being detected by an X-ray detector. However, while in conventional DPCI systems, typically the source grating is stationary and one of the other two gratings is moved with respect to the stationary gratings, in a DPCI apparatus using the proposed anode, the modulating absorption grid may serve as a source grating which, during operation, is moved together with a rotated anode disk such that a modulated X-ray beam is emitted from the X-ray tube. Using such modulated X-ray beam, the other gratings, i.e. the phase-shift grating and the phase analyzer grating may be provided in fixed stationary positions for example with respect to the X-ray detector. As these gratings do not have to be translated with respect to the X-ray detector during DPCI system operation, there is reduced risk of deteriorated imaging results due to mechanical inaccuracies.

Preferably, the anode disk and the modulating absorption grid are joined fixedly. According to an embodiment, the anode disk and the modulating absorption grid are integrated in one single piece. Such single piece combined component serving as an X-ray anode for generating an X-ray beam upon impact of accelerated electron as well as serving for modulating this X-ray beam using the grid integrally formed with the anode disk may exhibit e.g. particular mechanical stability.

According to an embodiment, the slits are longitudinal and have a longitudinal axis being substantially perpendicular to an abutting surface of the anode disk. In other words, the wall portions of the ring-like modulating absorption grid may be formed such that slits between neighboring wall portions extend substantially perpendicular to a surface of the anode disk on which these wall portions protrude.

According to an embodiment, the slits in the modulating absorption grid are arranged equidistantly. In other words, the wall portions of the modulating absorption grid may be formed such that each of the wall portions has the same width and each of the slits has the width. Accordingly, upon rotation of the anode, the X-ray beam being transmitted through the modulating absorption grid is modulated periodically.

According to an embodiment, the modulating absorption grid comprises a reinforcement structure for mechanically reinforcing the wall portions against centrifugal forces, the reinforcement structure at least partially bridging the slits and being adapted to have at least 50% less, preferably at least 80% less X-ray absorption than the wall portions. For example, the reinforcement structure may be made from a material showing low X-ray absorption (low Z-number) such as carbon fibers or may be made from a same or similar material as the wall portions but may have a substantially reduced thickness compared to the wall portions. Such reinforcement structure may help to keep the mechanical integrity of the modulating absorption grid upon high forces occurring e.g. when the anode is rotated during operation, particularly when the modulating absorption grid is also subjected to very high temperatures as they occur upon impact of back-scattered electrons.

According to a second aspect of the invention, an X-ray tube is proposed. This X-ray tube comprises an electron source, an electron accelerating and focusing arrangement and an anode as proposed further above. The electron source is adapted to generate free electrons. The electron accelerating and focusing arrangement is adapted to accelerate the free electrons in the impacting direction and to focus the free electrons in a focal spot on the circular focal track region of the anode. Furthermore, the electron accelerating and focusing arrangement and the anode are adapted such that the focal spot has a greater width than the spacing between neighboring slits in the modulating absorption grid.

In other words, the components, particularly the anode, of the proposed X-ray tube are adapted such that the slits in the modulating absorption grid are preferably significantly smaller in width and are spaced from each other in a circumferential direction at significantly smaller spacing than the width of the focal spot on the anode disk. Preferably, the width of the focal spot is greater than a sum of the widths of a wall portion and the adjacent two slits. Even more preferably, the focal spot is greater than the sum of the widths of several wall portions and of the associated slits. Having such dimensions, an X-ray beam emitted from the focal spot is always transmitted through a plurality of slits of the modulating absorption grid simultaneously.

According to an embodiment, the slits are longitudinal with a longitudinal axis being substantially parallel to the impacting direction of the accelerated electrons.

According to an embodiment, the anode is adapted to be rotated around a rotation axis and the slits are longitudinal with a longitudinal axis being substantially parallel to the rotation axis.

According to a third aspect of the invention, a DPCI apparatus is proposed. The DPCI apparatus comprises an X-ray tube as proposed further above, an X-ray detector, a first grid and a second grid. The X-ray tube and the X-ray detector are arranged at opposite sides of an examination volume. The first grid and the second grid are arranged between the examination volume and the X-ray detector.

In other words, a DPCI apparatus is proposed to comprise an X-ray tube with a modulating absorption grid as proposed above. With such X-ray tube, a modulated X-ray beam may be generated. Such X-ray beam may then be used in conjunction with other components as they are included in a conventional DPCI apparatus such as an X-ray detector, a first grid serving as a phase-shift grating, and a second grid, serving as a phase analyzer grating.

According to an embodiment, the first and the second grid are fixed at stationary positions with respect to the X-ray detector. Such fixed positioning of the first and second grid is enabled due to the fact that with the above proposed X-ray tube, a modulated X-ray beam may be generated. Accordingly, it is not necessary to move any of the first and second grid during operation of the DPCI apparatus.

According to an embodiment, the DPCI apparatus further comprises an X-ray tube control and an X-ray detector evaluation unit. The X-ray tube control is adapted for controlling a rotation velocity of the anode of the X-ray tube. The X-ray detector evaluation unit is adapted to receive a rotation information about at least one of the rotation velocity and a rotation phase of the anode of the X-ray tube from the X-ray tube control unit and to receive imaging data from the X-ray detector. The X-ray detector evaluation unit is then further adapted to process the imaging data based on the rotation information.

In other words, the apparatus may be adapted to control a rotation phase or rotation velocity of a rotating anode of the X-ray tube and to, based on information about such rotation velocity/phase, process imaging data received from the X-ray detector in order to derive phase information comprised in such imaging data.

According to an embodiment, the X-ray detector evaluation unit comprises a de-multiplexer unit with a plurality of registers.

In such embodiment, the X-ray detector evaluation unit may be adapted to sort and accumulate signals of the imaging data in one of the plurality of registers depending on the rotation information. In other words, for example depending on current information about the rotation phase of the rotating anode and its modulating absorption grid, the X-ray detector evaluation unit sorts and accumulates signals from the X-ray detector into a specific one of the plurality of registers of the de-multiplexer unit. Upon accumulation of sufficient signals, the registers may be read-out and an overall imaging information may be derived therefrom.

Furthermore, in such embodiment, it may be beneficial to include an X-ray detector evaluation unit which is adapted to sample signals from the imaging data at a sampling rate of less than 100 ns, preferably less than 10 ns. Using such X-ray detector evaluation unit enabling very fast sampling, the X-ray beam being modulated in its intensity by the modulation absorption grid of the anode at very high modulation rates may be sampled accurately.

According to an embodiment, the X-ray detector comprises photon counting detector pixels. Typically, such photon counting detector pixels may be read-out at very high sampling rates and signals from such detector pixels may be sorted and accumulated digitally.

It has to be noted that possible features and advantages of aspects and embodiments of the invention are described herein with reference to different subject matters. Particularly, some of the embodiments are described with reference to an anode, some of the embodiments are described with reference to an X-ray tube and some of the embodiments are described with reference to a DPCI apparatus. However, a person skilled in the art will derive from the above and the following description that, unless otherwise notified, in addition to any combination of features belonging to one type of subject matter also any combination between features relating to different subject matters is considered to be disclosed within this application. Particularly, features may be replaced or combined in a suitable manner for example for providing synergetic effects that are more than the simple sum of the features.

BRIEF DESCRIPTION OF THE DRAWINGS

Embodiments of the invention are described with reference to the enclosed drawings hereinafter. However, neither the description nor the drawings shall be interpreted as limiting the invention.

The figures are only schematic and not to scale. Generally, same reference signs are used for same or similar features throughout the figures.

DETAILED DESCRIPTION OF EMBODIMENTS

Introductorily, general principles and features of a differential phase contrast imaging apparatus 1 shall be described with reference to FIG. 1.

Figure 1:
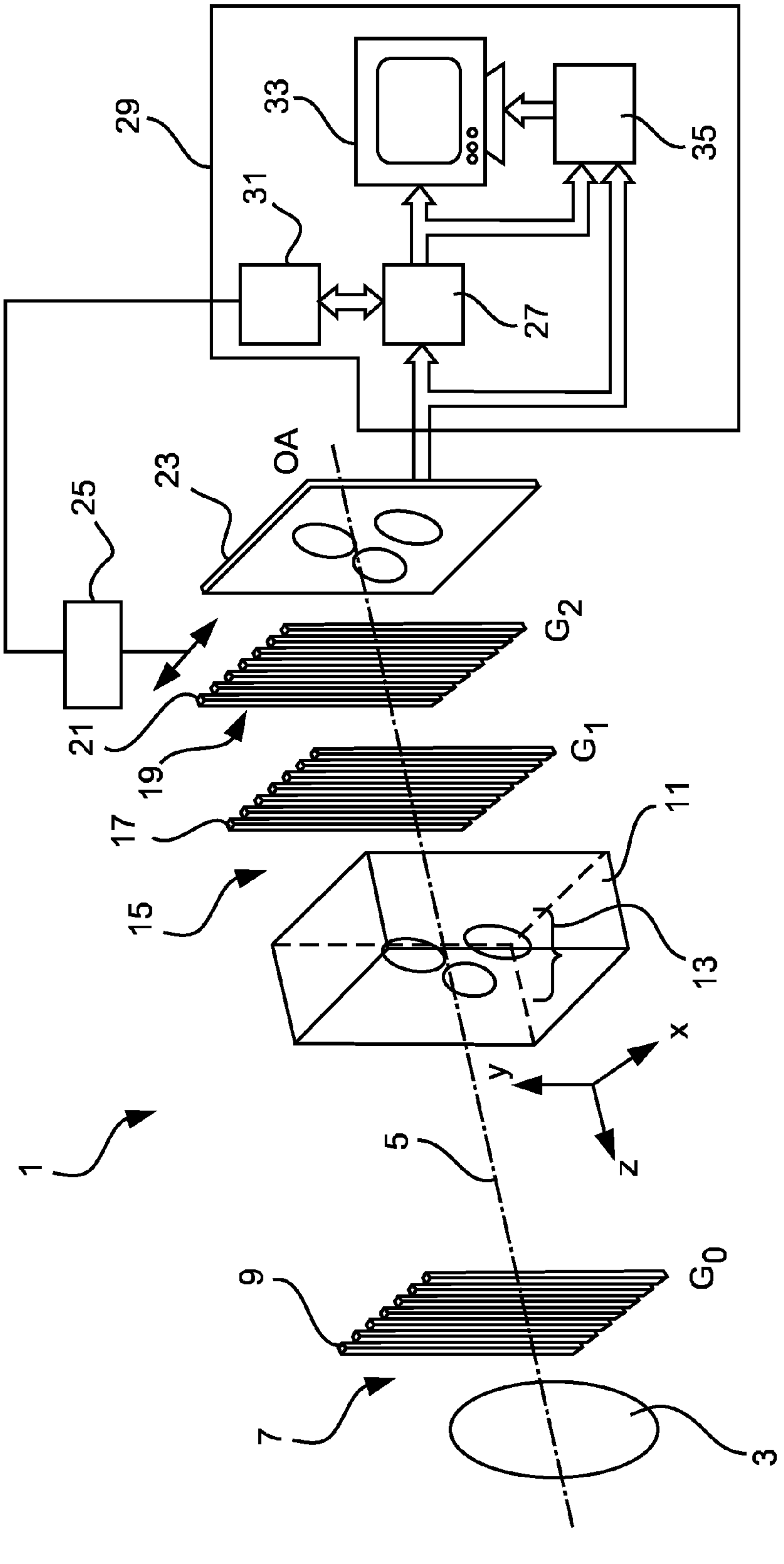
FIG. 1 shows general features of a DPCI apparatus.

FIG. 1 shows an experimental DPCI grating interferometer setup for a Talbot-Laue type hard-X-ray imaging interferometer. An X-ray source 3 generates an X-ray beam 5 as schematically indicated in FIG. 1. The X-ray beam 5 extends in an emission direction z. Before reaching an examination volume 11 in which an object 13 to be examined may be positioned, the X-ray beam 5 is transmitted through a source grating 7, referred to as $G_0$. The source grating 7 comprises multiple walls 9 extending like fingers in y-direction and being spaced from each other in x-direction. Using the source grating 7, an X-ray beam 5 having a specific spatial coherence may be generated from the X-ray beam originally coming from the incoherent X-ray source 3. After having been transmitted through the source grating 7, the X-ray beam 5 is transmitted through the examination volume 11 comprising the object 13 of interest. The X-ray beam 5 is then transmitted through a phase-shift diffraction grating 15, referred to as $G_1$. This phase-shift diffraction grating 15 may comprise e.g. multiple walls 17 of silicon material. Finally, the X-ray beam 5 is transmitted through a phase analyzer grating 19, referred to as $G_2$. This phase analyzer grating 19 comprises multiple walls 21 of X-ray absorbing material. An X-ray detector 23 may then detect the local distribution of X-ray intensity transmitted, inter alia, through the examination volume 11.

Using the various gratings 7, 15,19 or grids and information about their actual positioning with respect to each other, information about the phase of the X-rays detected by the detector 23 may be derived. Particularly, the diffractive phase-shift grating 15 having a plurality of equi-distant X-ray absorbing walls extending in parallel in a direction normal to interferometer's optical axis may serve as a phase-shifting beam splitter and is placed in downstream direction behind the object 13 to be examined. The absorbing phase analyzer grating 19 and the X-ray detector 23 may be used for detecting image data of a Moiré interference pattern containing information about the phase shift of the deflected and phase-shifted X-ray beam 5 after passing through both the object 13 and the diffractive phase-shift grating 15. In conventional DPCI systems, the phase analyzer grating 19 may be moved laterally, i.e. in x-direction, by an actuator 25 in order to scan the Moiré interference pattern.

Moreover, an X-ray detector evaluation unit 29 is provided. Imaging data from the X-ray detector 23 are submitted to a microprocessor 27. The microprocessor 27 controls and receives data from a controller 31 controlling the phase-stepping of the actuator 25 and the phase analyzer grating 19. The processed data may be stored in a memory 35 and displayed on a screen 33.

In a conventional DPCI apparatus, the source grating 7 is typically stationary whereas one of the phase-shift grating 15 and the phase analyzer grating 19 are laterally moved during imaging operation in order to scan the Moiré interference pattern generated upon transmitting the X-ray beam 5 through the various gratings 7, 15, 19.

However, particularly in DPCI systems such as the C-arm medical imaging system shown in FIG. 5 and described further below, the X-ray source 3 and the X-ray detector 23 together with the gratings 7, 15, 19 may have to be moved rapidly with respect to the examination volume 11 during imaging operation. In such fast moving imaging system, it may be difficult to translate e.g. the phase analyzer grating 19 with high precision using the actuator 25. Similarly, in an X-ray imaging modality such as a computer tomography (CT) apparatus accurate phase stepping for DPCI may be difficult due to e.g. mechanical instabilities in a rotating CT gantry and may require an expensive actuator.

Figure 2:
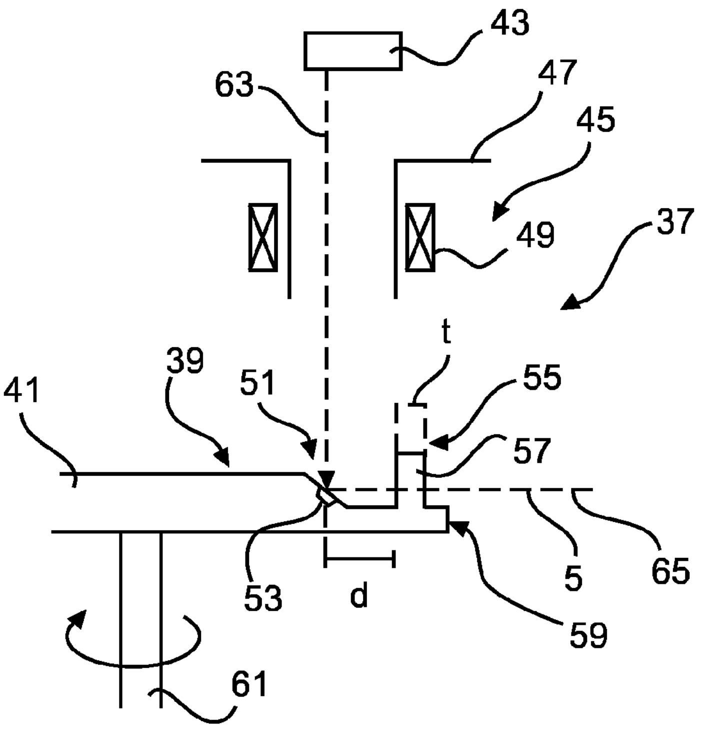
FIG. 2 shows a side view of an X-ray tube according to an embodiment of the present invention.

FIG. 2 shows an X-ray tube 37 comprising an anode 39 usable for a DPCI apparatus 1 according to an embodiment of the present invention.

The X-ray tube 37 comprises an electron source 43 for generating free electrons. For example, the electron source 43 may be a heated cathode being on a negative electrical potential of e.g. −100 kV.

The X-ray tube 37 further comprises an electron accelerating and focusing arrangement 45 for accelerating the free electrons emitted by the electron source 43 into an impacting direction 63 and for focusing the beam of free electrons in a focal spot 53 on a circular focal track region 51 of the anode 39. The electron accelerating and focusing arrangement 45 comprises an anode element 47 being on a more positive electrical potential than the electron source 43 such that free electrons from the electron source 43 are accelerated towards the cylindrical anode 47. For example, the anode element 47 may be on a same or similar electrical potential as the anode 39. Furthermore, the electron accelerating and focusing arrangement 45 comprises a focusing unit 49 which includes for example electrical coils 49 and/or capacitor plates for generating suitable magnetic and/or electric fields for focusing the beam of free electrons towards the focal spot 53.

The anode 39 comprises an anode disk 41. This anode disk 41 may be circular and may have a rotation shaft 61 around which the anode 39 may be rotated during X-ray tube operation. The anode disk 41 may be thicker in a center than close to a circumference and may have a slanted area forming a focal track region 51 in which the surface of the anode disk 41 is at an angle of e.g. between 30° and 60° with respect to the impacting direction 63 of the electron beam. Free electrons accelerated from the electron source 43 towards the anode disk 41 impact onto the focal track region 51 in a focal spot 53 and generate Bremsstrahlung emitted as an X-ray beam 5 in an emission direction 65 transverse to the impacting direction 63. For example, the emission direction 65 may be rectangular to the impacting direction 63.

The anode 37 according to an embodiment of the present invention further comprises a ring-like modulating absorption grid 55. This modulating absorption grid 55 encloses the focal track region 51. In other words, the ring-like modulating absorption grid 55 is arranged radially outwardly with respect to the circular focal track region 51, i.e. the ring formed by the modulating absorption grid 55 has a larger radius than the ring formed by the focal track region 51. Accordingly, the X-ray beam 5 emitted from the focal spot 53 upon impact of accelerated electrons is emitted in the emission direction 65 which crosses the modulating absorption grid 55 and is at least partially transmitted through the modulating absorption grid 55.

Figure 3:
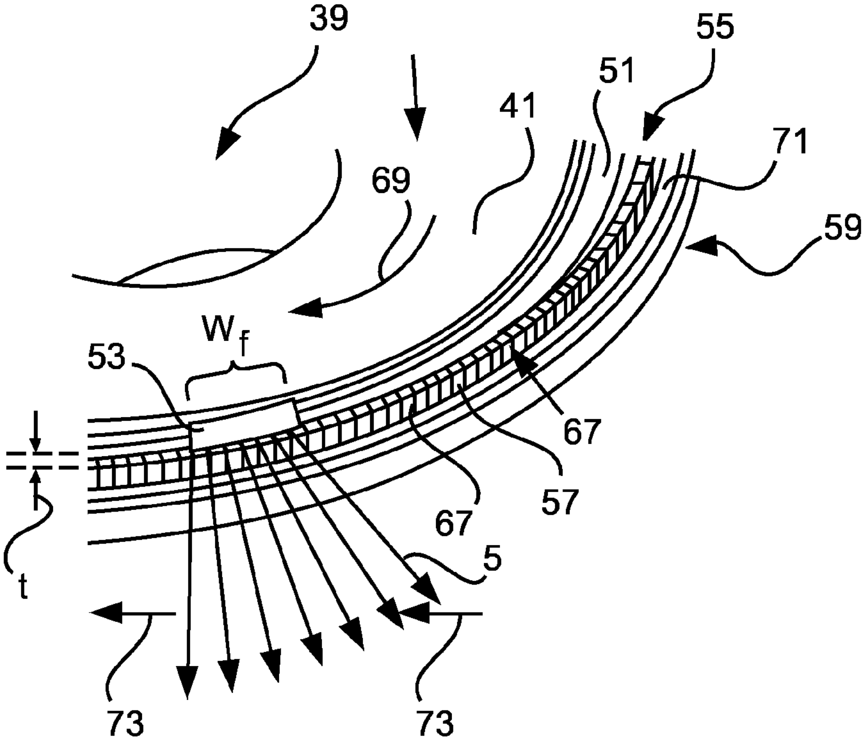
FIG. 3 shows a perspective view onto an anode of an X-ray tube according to an embodiment of the present invention.
Figure 4:
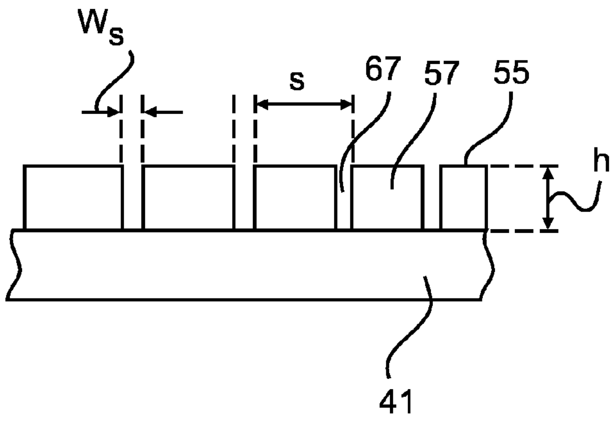
FIG. 4 shows a front view onto a portion of the anode of FIG. 3.

As also shown in the perspective view of FIG. 3 and the front view of FIG. 4, the modulating absorption grid 55 comprises wall portions 57 of an X-ray absorbing material. For example, the X-ray absorbing material may be molybdenum, tungsten, tantalum or other high-Z materials. Furthermore, the wall portions 57 may have a sufficient thickness t of e.g. between 0.1 and 2 mm such that the X-ray beam 5 is significantly absorbed, e.g. by more than 50%, preferably by more than 90% when transmitted through the wall portions 57.

However, the ring-like wall of the modulation absorption grid 55 does not continuously encircle the focal track region 51. Instead, the modulating absorption grid 55 comprises slits 67 or gaps between neighboring wall portions 57 through which the X-ray beam 5 coming from the focal spot 53 may be transmitted without being essentially absorbed. These slits 67 may be significantly smaller than the adjacent wall portions 57. For example, a width $w_s$ of a slit 57 measured in circumferential direction of the anode disk 41 may be less than 50 μm, preferably less than 20 μm and more preferably less than 10 μm. A spacing s between neighboring slits 67 may be less than 100 μm, preferably less than 50 μm, more preferably less than 20 μm. In an actual embodiment of the anode disk 41, the width $w_s$ of the slits 67 may be e.g. 5 μm at a pitch, i.e. at spacings s, of 20 μm. A height h of the wall portions 57 may be e.g. more than 0.5 mm, preferably more than 1 mm, for example 2 mm.

The slits 67 in the embodiment shown in FIGS. 2 to 4 are arranged between neighboring wall portions 57 forming a cylindrical modulating absorption grid 55. The slits 67 are longitudinal, i.e. elongate, with a constant width $w_s$ and with a longitudinal axis being parallel to the rotation axis 61 of the anode 37.

Figure 5:
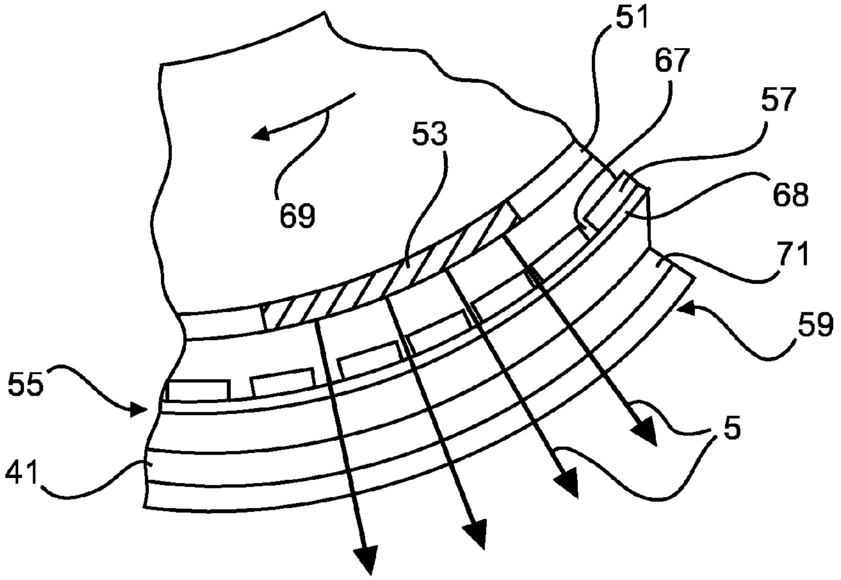
FIG. 5 shows a perspective view onto a portion of an anode with a reinforcement structure in accordance with another embodiment of the present invention.

It may be beneficial to enhance the mechanical stability of the wall structure with a reinforcement structure 68 as shown in FIG. 5 e.g. by adding a strengthening structure of low-Z material, which is substantially X-ray transparent. This structure may be arranged like a barrel-hoop around the slotted wall such as it bridges the slits 67 between neighboring wall portions 57, and may consist of e.g. carbon fiber material. Preferably, the fibers would be layed in circular direction. Another way of strengthening would be a ring of other low-Z material like Be. Another embodiment of the invention would be realized by using slits 67 of high-Z material, which are not completely cut through, but comprise residual bridges of material, such bridges being transparent to X-ray to a desired extent, e.g. 90% transparent due to their reduced thickness compared to the wall portions. The reinforcement structure would serve to prevent elements of the wall structure from being deformed by high centrifugal forces at the rotating anode, and under high temperature in the vicinity of the focal spot of the X-ray tube.

The ring-like modulating absorption grid 55 may be arranged at or close to a circumference 59 of the anode disk 41. A distance d between the focal track region 51 and the modulating absorption grid 55 may be adapted such that no excessive heating of the wall portions 57 of the modulating absorption grid 55 occurs upon transmission and partial absorption of the X-ray beam 5, or upon impact of backscattered electrons when operating the X-ray tube 37. For example, the distance d may be in a range of 0.5 to 20 mm.

The anode disk 41 and the modulating absorption grid 55 are preferably provided as a single piece, i.e. the modulating absorption grid 55 is unitary with the anode disk 41. For example, when manufacturing the anode 39, an anode disk 41 may be formed with a rim protruding perpendicularly from a surface 71 of the anode disk 41 close to its circumference 59. This rim may then be locally removed or interrupted using e.g. a laser tool thereby forming the slits 67 between neighboring wall portions 57.

As shown for example in detail in FIG. 3, upon operation of the X-ray tube 37, the anode 39 is rotated in a rotation direction 69 at a rotation velocity of e.g. 100 m/s. The electron accelerating and focusing arrangement 45 is adapted such that the focal spot 53 on the anode 39 has a width $w_f$ being substantially greater than the width $w_s$ of the slits 67. For example, the width $w_f$ of the focal spot may be larger than 100 μm whereas the width $w_s$ of the slits 67 is typically smaller than 10 μm. Furthermore, the width of the focal spot 53 is also significantly greater than the spacing s between neighboring slits 67, such spacing being for example 20 μm. Accordingly, the X-ray beam 5 emitted from the focal spot 53 is not only transmitted through a single slit 67 upon operation of the X-ray tube 37 but is simultaneously transmitted through a plurality of neighboring slits 67. For example, as shown in FIG. 3, the X-ray beam 5 is transmitted through six neighboring slits 67 simultaneously.

As the anode 39 is rotated during operation of the X-ray tube 37 and as the modulating absorption grid 55 is fixedly joined with the anode disk 41, both the focal spot 53 as well as an adjacent portion of the modulating absorption grid 55 are rotated, i.e. are moved parallel to the circumference 59. Upon such motion, the X-ray beam 5 emitted from the focal spot 53 and transmitted through the modulating absorption grid 55 is continuously modulated. In other words, as indicated with the arrows 73 in FIG. 3, portions of the X-ray beam 5 being transmitted through one of the slits 67 will move in the rotation direction 69 for a short period of time before being "handed-over" to a neighboring set of slits 67.

The X-ray tube 37 may be applied in a DPCI apparatus 1 similar to the one shown in FIG. 1. However, instead of moving the phase analyzer grating 19, phase stepping may be provided by using the modulated X-ray beam 5 generated using the rotating anode 37 comprising the modulating absorption grid 55 fixed on the anode disk 41. In other words, the modulating absorption grid 55 may serve as a source grating $G_0$ for phase stepping whereas the other two grids $G_1$, $G_2$ behind the examination volume 11 may be stationary, i.e. may be fixed e.g. with respect to the detector 23.

The interference pattern generated upon X-ray transmission through the modulating absorption grid 55 and the two grids 15, 19 behind the examination volume 11 may then be sampled at the detector 23 at a sufficiently high sampling rate of less than 100 ns, preferably less than 20 ns, for example 10 ns which is the time in which the modulating absorption grid 55 typically moves by approximately1 μm assuming an anode rotation velocity of e.g. 100 m/s.

Figure 7:
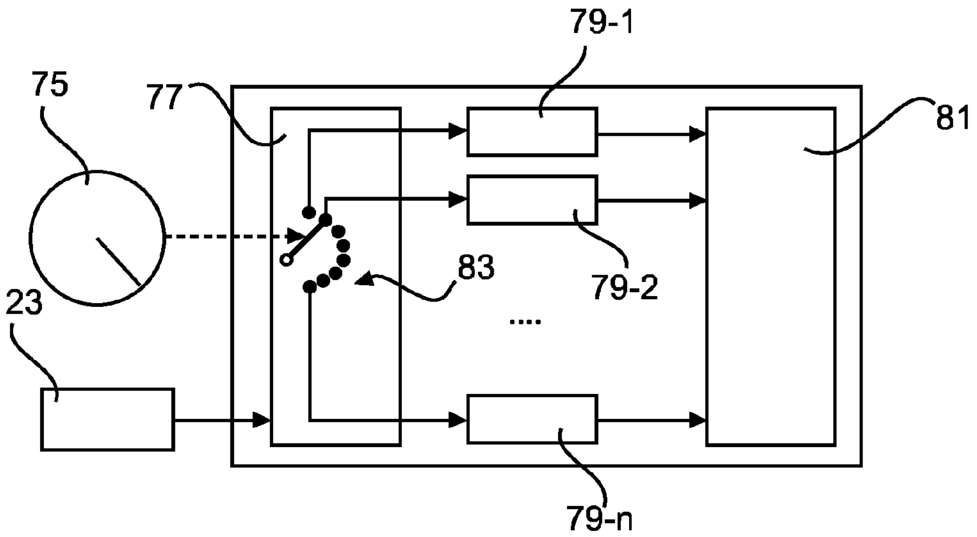
FIG. 7 visualizes general operation principles of an X-ray detector evaluation unit for a DPCI apparatus according to an embodiment of the invention.

For sampling the output of the detector 23, a DPCI apparatus may comprise an X-ray tube control unit 75 and an X-ray detector evaluation unit 77 as schematically shown in FIG. 7. The X-ray tube control unit 75 is adapted for controlling a rotation velocity of the anode 39 of the X-ray tube 37. The X-ray detector evaluation unit 77 is adapted to receive rotation information for example directly from the X-ray tube control unit 75. Furthermore, the X-ray detector evaluation unit 77 receives imaging data from the output of the X-ray detector 23.

The X-ray detector evaluation unit 77 comprises for example a de-multiplexer 83 and a plurality of registers 79. The de-multiplexer 83 may be controlled based on the rotation information provided by the X-ray tube control unit 75 and may sort received imaging data from the X-ray detector 23 into an associated one of the plurality of registers 79.

Figure 8:
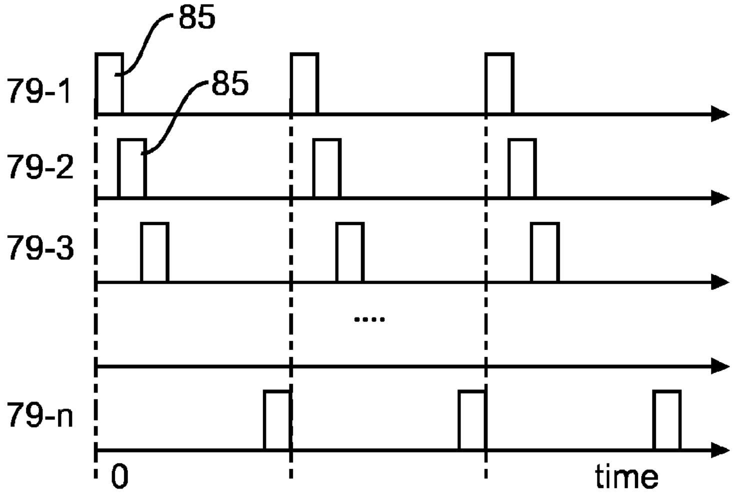
FIG. 8 visualizes a principle of sorting and accumulating signals in the X-ray detector evaluation unit of FIG. 7.

Accordingly, by periodically sampling signals 85 into an associated one of the registers 79-1, 79-2, . . . **79-*n*, as indicated in FIG. 8, detector signals may be accumulated in an associated one of the registers 79 in accordance with the rotation phase of the anode 39 of the X-ray tube 37. By reading out the accumulated signals from the registers 79, the phase information comprised in the DPCI signals may be derived in a reconstruction unit 81**.

For suitably sampling the detector signals, at least six registers 79 should be available and the de-multiplexer 83 should be adapted to suitably distribute the signals into associated ones of the registers 79. In other words, an anode phase of rotation may be an input to a reconstruction unit comprising the X-ray detector evaluation unit 77, which sorts the actual measured interference pattern into for example eight multiplexing registers for image storage. Each register integrates the information of a single phase step over an entire imaging cycle, i.e. for example over a CT projection or radiographic exposure. For example given a 10 ns sampling period, 10,000 samples may be integrated per CT integration period of 100 μs.

The detector 23 may be provided with photon counting detectors to achieve a sufficiently high sampling rate. Such detectors are generally pixelated and are used for medical imaging, e.g. for Mammography. They typically consist of direct conversion material like CZT (Cadmium zinc telluride), which generates pulses of electrical current upon impact of X-ray photons.

Figure 6:
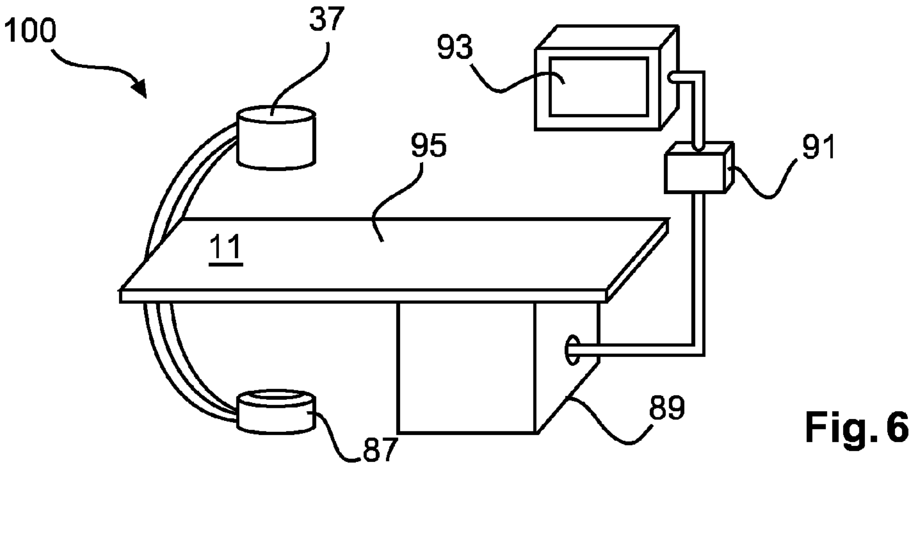
FIG. 6 shows general features of a medical DPCI apparatus.

FIG. 6 shows a medical X-ray imaging apparatus 100 in which the DPCI apparatus described herein may be implemented. The X-ray imaging apparatus 100 comprises a C-arm system wherein the X-ray tube 37 is attached to one end of a C-arm and a detector unit 87 comprising the X-ray detector 23 as well as the two grids 15, 19 is attached to an opposing end of the C-arm. The C-arm together with the X-ray tube 37 and the detector unit 87 may be rotated around an examination volume 11 being situated on top of a patient table 95. The C-arm together with the X-ray tube 37 and the detector unit 87 are connected to a control unit 91 comprising the X-ray tube control unit 75 as well as the X-ray detector evaluation unit 77 (connection not shown in FIG. 6 for clarity reasons). Furthermore, the control unit 91 is also connected to a basis 89 of the patient table 95 comprising an actuation mechanism for moving the patient table 95. The control unit 91 is connected to a display 93 for visualizing the imaging results provided by the DPCI apparatus.

Finally, it should be noted that terms such as "comprising" do not exclude other elements or steps and that the indefinite article "a" or "an" does not exclude the plural. Also elements described in association with different embodiments may be combined. It should also be noted that reference signs in the claims shall not be construed as limiting the scope of the claims.

LIST OF REFERENCE SIGNS

1 DPCI apparatus
3 electron source
5 electron beam
7 source grating
9 walls of source grating
11 examination volume
13 object of interest
15 first/phase shift grating
17 walls of first grating
19 second/phase analyzer grating
21 walls of second grating
23 detector
25 actuator
27 microprocessor
29 X-ray detector evaluation unit
31 controller
33 display
35 memory
37 X-ray tube
39 anode
41 anode disk
43 electron source
45 electron accelerating and focusing arrangement
47 anode element
49 coils
51 focal track region

53 focal spot
55 modulating absorption grid
57 wall portion
59 circumference of anode disk
61 rotation shaft
63 impacting direction
65 emission direction
67 slits
69 rotation direction
71 anode surface
73 modulation direction
75 X-ray tube control unit
77 X-ray detector evaluation unit
79 registers
81 reconstruction unit
83 de-multiplexer
85 detector signals
87 detector unit
89 base of patient table
91 control
93 display
95 patient table
100 X-ray imaging apparatus

The invention claimed is:

1. Anode for an X-ray tube, comprising:
an anode disk comprising a circular focal track region being adapted to, upon impact of accelerated electrons, emit X-rays in an emission direction transverse to an impacting direction of the electrons;
a ring-like modulating absorption grid;
wherein the modulating absorption grid encloses the focal track region;
wherein the modulating absorption grid comprises wall portions of X-ray absorbing material, the wall portions being arranged such as to absorb X-rays emitted from the focal track region in the emission direction;
wherein the modulating absorption grid comprises slits between neighboring wall portions, the slits being arranged along a circumferential direction of the modulating absorption grid at spacings (s) of less than 100 μm and the slits having a width ($w_s$) in the circumferential direction of less than 50 μm.

2. Anode according to claim 1, wherein the anode disk and the modulating absorption grid are integrated in a single piece.

3. Anode according to claim 1, wherein the slits are longitudinal with a longitudinal axis being substantially perpendicular to an abutting surface of the anode disk.

4. Anode according to claim 1, wherein the slits in the modulating absorption grid are arranged equidistantly.

5. Anode according to claim 1, wherein the modulating absorption grid comprises a reinforcement structure for mechanically reinforcing the wall portions against distortion, the reinforcement structure at least partially bridging the slits and being adapted to have at least 50% less X-ray absorption than the wall portions.

6. X-ray tube comprising:
an electron source;
an electron accelerating and focusing arrangement;
an anode according to claim 1;
wherein the electron source is adapted to generate free electrons;
wherein the electron accelerating and focusing arrangement is adapted to accelerate the free electrons in the impacting direction and to focus the free electrons in a focal spot on the circular focal track region of the anode; and
wherein the electron accelerating and focusing arrangement and the anode are adapted such that the focal spot has a greater width ($w_f$) than the spacing (s) between neighboring slits in the modulating absorption grid.

7. X-ray tube according to claim 6, wherein the slits are longitudinal with a longitudinal axis being substantially parallel to the impacting direction.

8. X-ray tube according to claim 6, wherein the anode is adapted to be rotated around a rotation axis and wherein the slits are longitudinal with a longitudinal axis being substantially parallel to the rotation axis.

9. Differential phase contrast imaging apparatus comprising:
an X-ray tube according to claim 6;
an X-ray detector;
a first grid;
a second grid;
wherein the x-ray tube and the X-ray detector are arranged at opposite sides of an examination volume; and
wherein the first grid and the second grid are arranged between the examination volume and the X-ray detector.

10. Apparatus according to claim 9, wherein both the first and the second grid are fixed at stationary positions with respect to the X-ray detector.

11. Apparatus according to claim 9, further comprising an X-ray tube control unit and an X-ray detector evaluation unit,
the X-ray tube control unit being adapted for controlling a rotation velocity of the anode of the X-ray tube, and
the X-ray detector evaluation unit being adapted to receive rotation information about at least one of the rotation velocity and a rotation phase of the anode of the X-ray tube from the X-ray tube control unit and to receive imaging data from the X-ray detector and to process the imaging data based on the rotation information.

12. Apparatus according to claim 11, wherein the X-ray detector evaluation unit comprises a de-multiplexer unit with a plurality of registers.

13. Apparatus according to claim 12, wherein the X-ray detector evaluation unit is adapted to sort and accumulate signals of the imaging data in one of the plurality of registers depending on the rotation information.

14. Apparatus according to claim 13, wherein the X-ray detector evaluation unit is adapted to sample signals of the imaging data at a sampling rate of less than 100 ns.

15. Apparatus according to claim 9, wherein the X-ray detector comprises photon counting detector pixels.

* * * * *